(12) United States Patent
Wu

(10) Patent No.: US 11,720,169 B2
(45) Date of Patent: Aug. 8, 2023

(54) INTERACTION METHOD AND SYSTEM BASED ON VIRTUAL REALITY EQUIPMENT

(71) Applicant: Qingdao Pico Technology Co., Ltd., Shandong (CN)

(72) Inventor: Tao Wu, Shandong (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/881,920

(22) Filed: Aug. 5, 2022

(65) Prior Publication Data

US 2022/0374073 A1    Nov. 24, 2022

Related U.S. Application Data

(63) Continuation of application No. PCT/CN2021/112624, filed on Aug. 13, 2021.

(30) Foreign Application Priority Data

Aug. 14, 2020 (CN) .......................... 202010818597.6

(51) Int. Cl.
*G06F 3/01* (2006.01)
*G06F 3/0346* (2013.01)
*G06T 13/40* (2011.01)

(52) U.S. Cl.
CPC ............ *G06F 3/012* (2013.01); *G06F 3/0346* (2013.01); *G06T 13/40* (2013.01)

(58) Field of Classification Search
None
See application file for complete search history.

(56) References Cited

U.S. PATENT DOCUMENTS

2016/0012465 A1\* 1/2016 Sharp ................... G06Q 20/321
                                                            705/14.17
2016/0300387 A1   10/2016 Ziman
                         (Continued)

FOREIGN PATENT DOCUMENTS

CN         107667331 A      2/2018
CN         109445573 A      3/2019
                         (Continued)

OTHER PUBLICATIONS

International Search Report (PCT/ISA/210) with translation and Written Opinion (PCT/ISA/237) dated Nov. 11, 2021, by the China Patent Office as the International Searching Authority for International Application No. PCT/CN2021/112624.

(Continued)

*Primary Examiner* — Hilina K Demeter
(74) *Attorney, Agent, or Firm* — Buchanan Ingersoll & Rooney PC

(57) ABSTRACT

An interaction method and system based on virtual reality equipment are disclosed. The method comprises: rendering a user avatar of each virtual reality equipment in the virtual reality scene of each virtual reality equipment according to user data of multiple virtual reality equipments; acquiring in real time position-posture tracking data of multiple users collected by multiple virtual reality equipments, wherein the position-posture tracking data carries user IDs; merging the position-posture tracking data of multiple users based on the user IDs carried by the position-posture tracking data, to obtain position-posture merging data of each user, wherein the position-posture merging data carries user ID; and updating position-posture status of user avatars having a same user ID in the virtual reality scene of each virtual reality equipment by using the position-posture merging data and
(Continued)

its carried user IDs, to realize interaction among different user avatars in the virtual reality scene.

16 Claims, 3 Drawing Sheets

(56) References Cited

U.S. PATENT DOCUMENTS

| | | | |
|---|---|---|---|
| 2017/0243324 A1* | 8/2017 | Mierle | G02B 27/017 |
| 2018/0255285 A1* | 9/2018 | Hall | A63G 31/16 |
| 2018/0268589 A1 | 9/2018 | Grant | |
| 2018/0359448 A1 | 12/2018 | Harries | |
| 2018/0374268 A1* | 12/2018 | Niles | H04N 21/21805 |
| 2019/0108681 A1* | 4/2019 | McBeth | G06T 19/006 |

FOREIGN PATENT DOCUMENTS

| | | |
|---|---|---|
| CN | 109671118 A | 4/2019 |
| CN | 110928414 A | 3/2020 |
| CN | 111199561 A | 5/2020 |
| CN | 111307146 A | 6/2020 |
| CN | 112130660 A | 12/2020 |
| WO | 2019037074 A1 | 2/2019 |

OTHER PUBLICATIONS

Office Action dated Apr. 28, 2023, by the Chinese Patent Office in corresponding Chinese Patent Application No. 202010818597.6. (7 pages).

* cited by examiner

INTERACTION METHOD AND SYSTEM BASED ON VIRTUAL REALITY EQUIPMENT

CROSS REFERENCE TO RELATED APPLICATIONS

This application is entered as a bypass continuation application under 35 U.S.C. § 111(a) of International Application No. PCT/CN2021/112624, filed on Aug. 13, 2021, which claims priority to Chinese Patent Application No. 202010818597.6, filed on Aug. 14, 2020. The embodiment of the priority applications are hereby incorporated herein in their entirety by reference.

TECHNICAL FIELD

The present disclosure relates to the field of virtual reality technology, in particular to an interaction method and system based on virtual reality equipment.

BACKGROUND

The life and entertainment based on the Internet has been experiencing a great change, which makes people's life and entertainment more and more socialized, cooperative and shared. However, VR (virtual reality) environment interaction by VR equipments based on VR technology is a significant exception. VR equipment users often find that although VR is very interesting, VR becomes very isolated due to the lack of social dimension.

SUMMARY

The embodiments of the present disclosure provide an interaction method and system based on virtual reality equipment, which is used to solve or partially solve the above problems.

In an aspect, the present disclosure provides an interaction method based on virtual reality equipment, comprising:

rendering a user avatar of each virtual reality equipment in the virtual reality scene of each virtual reality equipment according to user data of multiple virtual reality equipments;

acquiring in real time position-posture tracking data of multiple users collected by multiple virtual reality equipments, wherein the position-posture tracking data carries user IDs;

merging the position-posture tracking data of multiple users based on the user IDs carried by the position-posture tracking data, to obtain position-posture merging data of each user, wherein the position-posture merging data carries user ID; and updating position-posture status of user avatars having a same user ID in the virtual reality scene of each virtual reality equipment by using the position-posture merging data and its carried user IDs, to realize interaction among different user avatars in the virtual reality scene;

wherein the updating position-posture status of user avatars having a same user ID in the virtual reality scene of each virtual reality equipment by using the position-posture merging data and its carried user IDs comprises:

acquiring the position-posture merging data by using a first thread started by the virtual reality equipment, and rendering and updating the user avatars having a same user ID in the virtual reality scene using the position-posture merging data and its carried user IDs; and acquiring position-posture tracking data of an own user collected by the virtual reality equipment by using a second thread that is parallel to the first thread and started by the virtual reality equipment, and updating position-posture status of an own avatar in the virtual reality scene by using the position-posture tracking data of the own user collected.

In another aspect, an embodiment of the present disclosure provide an interaction system based on virtual reality equipment, comprising: a data processing server, and multiple virtual reality equipments connected to the data processing server via a network;

the virtual reality equipments are for rendering a user avatar of each virtual reality equipment in the virtual reality scene of each virtual reality equipment according to user data of multiple virtual reality equipments, and collecting position-posture tracking data of own users and sending the collected position-posture tracking data of own users to the data processing server, wherein the position-posture tracking data carries user IDs;

the data processing server is for receiving in real time the position-posture tracking data of multiple users sent by multiple virtual reality equipments, merging the position-posture tracking data of multiple users based on the user IDs carried by the position-posture tracking data, and sending position-posture merging data of each user obtained to each virtual reality equipment, wherein the position-posture merging data carries user ID;

the virtual reality equipments are further for updating position-posture status of user avatars having a same user ID in the virtual reality scene of each virtual reality equipment by using the position-posture merging data and its carried user IDs, to realize interaction among different user avatars in the virtual reality scene; wherein the updating position-posture status of user avatars having a same user ID in the virtual reality scene of each virtual reality equipment by using the position-posture merging data and its carried user IDs comprises:

acquiring the position-posture merging data by using a first thread started by the virtual reality equipment, and rendering and updating the user avatars having a same user ID in the virtual reality scene using the position-posture merging data and its carried user IDs; and acquiring position-posture tracking data of an own user collected by the virtual reality equipment by using a second thread that is parallel to the first thread and started by the virtual reality equipment, and updating position-posture status of an own avatar in the virtual reality scene by using the position-posture tracking data of the own user collected.

In a third aspect, an embodiment of the present disclosure further provides an electronic device, comprising: a processor; and a memory configured to store computer executable instructions that, when executed, cause the processor to execute the interaction method based on virtual reality equipment above.

In a fourth aspect, an embodiment of the present disclosure further provides a computer-readable storage medium storing one or more programs that, when executed by an electronic device including a plurality of application programs, cause the electronic device to execute the interaction method based on virtual reality equipment above.

At least one of the above technical solutions adopted in the embodiments of the present disclosure can achieve the following beneficial effects.

In the embodiments of the present disclosure, the users of multiple VR equipments are virtualized into the same VR scene, so that the users in the same physical area or in different physical areas experience the same VR environment; by merging the position-posture tracking data of multiple users, and updating the position-posture status of user avatars having the corresponding user IDs in the virtual reality scene displayed in each virtual reality equipment by using the position-posture merging data obtained by data merging and the user IDs, the interaction among different user avatars in the virtual reality scene is realized, and other users can observe the status of other users in the VR scene in real time on the VR equipment from a third perspective, so that the user's VR experience is enhanced, and it is made possible for content creators to integrate social and multi-user dimensions into the VR world.

And the calculation frequency with which the VR equipment collects the position-posture tracking data of its own user is different from the calculation frequency with which the data processing server obtains the position-posture merging data, therefore, in this embodiment, each VR equipment starts two parallel processing threads to update the position-posture status of its own avatar and the position-posture status of other user avatars respectively, so as to avoid the delay of position-posture status update caused by different calculation frequencies.

DETAILED DESCRIPTION

Hereinafter, exemplary embodiments of the present disclosure will be described in detail with reference to the drawings. In the following description, unless otherwise indicated, the same numerals in different drawings represent the same or similar elements. The implementation modes described in the following exemplary embodiments do not represent all implementation modes consistent with the present disclosure. On the contrary, they are only examples of devices and methods consistent with some aspects of the present disclosure as illustrated in the appended claims.

The terms used in the present disclosure are intended solely to describe specific embodiments only and are not intended to limit the present disclosure. The singular forms such as "a", "said" and "the" used in the present disclosure and the appended claims are also intended to include plural forms, unless otherwise expressly indicated in the context. It should also be understood that the term "and/or" as used herein refers to and includes any or all possible combinations of one or more associated listed items.

It should be understood that although the terms "first", "second", "third", etc. may be used to describe various information in the present disclosure, but not be used to limit such information. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "when" or "once" or "upon determination that . . . ".

The VR equipment is typically configured so that each user wears a single VR equipment for virtual reality interaction. This is mainly because the head mounted nature of VR equipment decides that it can provide VR for only one user at a time. Therefore, when two or more VR equipment users experience virtual reality at the same time in the real world, they may be immersed in different virtual reality environments without knowing each other's experience at all. For example, even when two VR equipments users are at adjacent physical locations, their VR experience may be completely different VR environments.

Based on the above description, an embodiment of the present disclosure provides a new interaction solution for the VR equipment users, so that the equipments are less isolated, more commutative and entertaining as a whole. The embodiments of the present disclosure can not only enable VR equipment users at the same physical location and in different physical environments to witness the same VR scene, but also allow the avatars of different users to interact in the VR environment.

Figure 1:
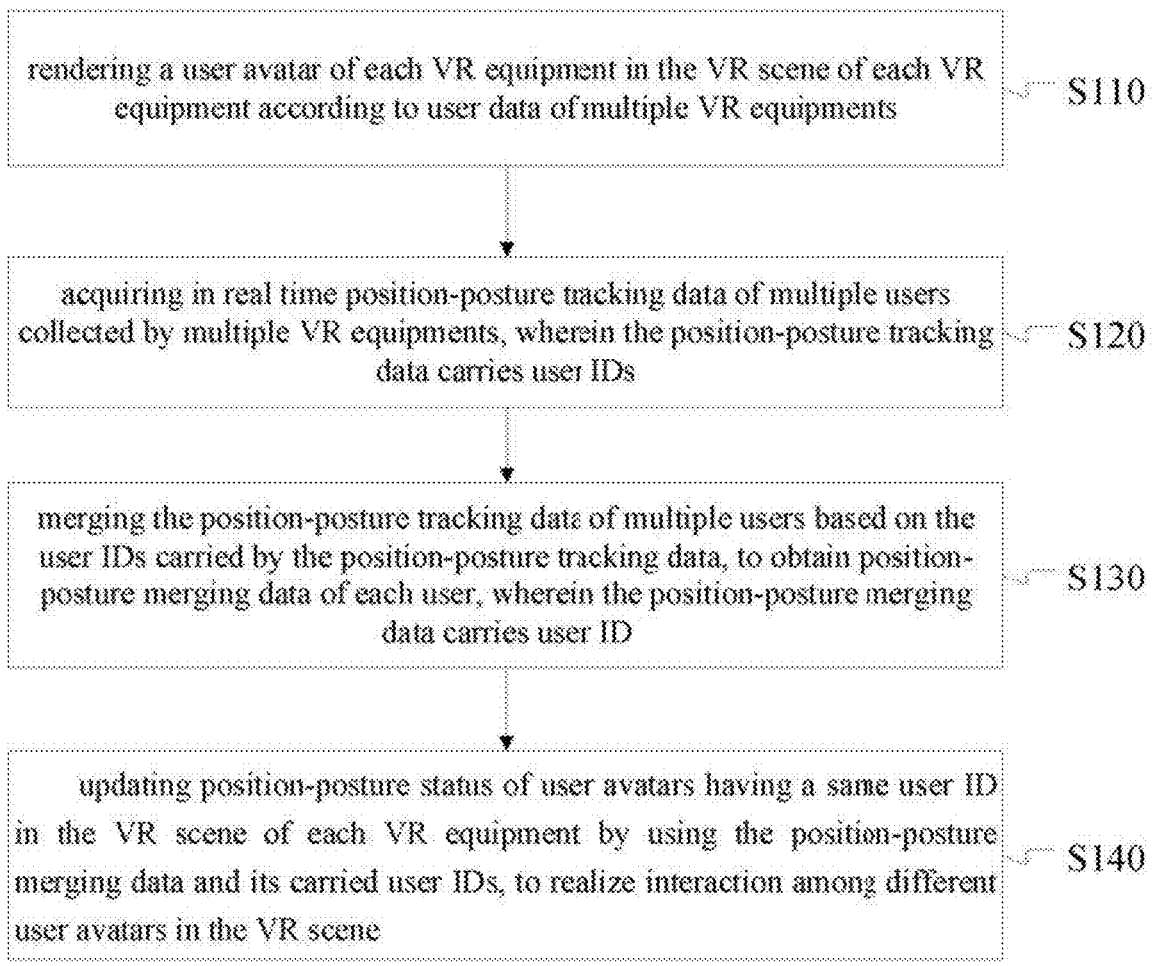
FIG. 1 is a flowchart of an interaction method based on VR equipments according to an embodiment of the present disclosure.

FIG. 1 is a flow chart of an interaction method based on VR equipments according to an embodiment of the present disclosure. As shown in FIG. 1, the interaction method of the embodiment of the present disclosure comprises the following steps:

Step S110, rendering a user avatar of each VR equipment in the VR scene of each VR equipment according to user data of multiple VR equipments;

In this embodiment, the rendering a user avatar of each VR equipment in the VR scene can be understood as rendering a user avatar of the own user of a VR equipment and user avatars of other VR equipments in the VR scene displayed by each VR equipment.

The user data includes but is not limited to body surface feature data of the user, such as the gender, height and skin color of the user. The personalized rendering of a user avatar is realized based on the user data.

Step S120, acquiring in real time position-posture tracking data of multiple users collected by multiple VR equipments, wherein the position-posture tracking data carries user IDs;

In this embodiment, each VR equipment collects the position-posture tracking data of its own user, and obtains the position-posture tracking data of multiple users collected by multiple VR equipments, which can be understood as acquiring the position-posture tracking data of the own user of each VR equipment collected by the respective VR equipment. Assume that there are N number of VR equipments, the first VR equipment collects the position-posture tracking data of its own user (expressed as user 1), and the second VR equipment collects the position-posture tracking data of its own user (expressed as user 2), . . . , the Nth VR equipment collects the position-posture tracking data of its own user (expressed as user N), thereby obtaining the position-posture tracking data collected by the N number of VR equipments in real time.

The position-posture tracking data is 6 DOF (degree of freedom) data, including user position data and user posture data. For example, the user's position-posture tracking data is collected by using a built-in sensor module of the VR equipment, and/or, the user's position-posture tracking data is collected by using a sensor in a handle controller externally connected to the VR equipment.

Step S130, merging the position-posture tracking data of multiple users based on the user IDs carried by the position-posture tracking data, to obtain position-posture merging data of each user, wherein the position-posture merging data carries user ID; and Step S140, updating position-posture status of user avatars having a same user ID in the VR scene of each VR equipment by using the position-posture merging data and its carried user IDs, to realize interaction among different user avatars in the VR scene.

As shown in FIG. 1, in this embodiment, the users of multiple VR equipments are virtualized into the same VR scene, so that the users in the same physical area or in different physical areas experience the same VR environment; by merging the position-posture tracking data of multiple users, and updating the position-posture status of user avatars having the corresponding user ID in the VR scene displayed by each VR equipment by using the position-posture merging data obtained by data merging and the user ID, the interaction among different user avatars in the VR scene is realized, and other users can observe the status of other users in the VR scene in real time on the VR equipment from a third perspective, so that the user's VR experience is enhanced, and it is made possible for content creators to integrate social and multi-user dimensions into the VR world.

Taking the remote interaction among N number of VR equipment users as an example, the implementation steps of the interaction method in FIG. 1 are described in detail with reference to FIG. 2.

Figure 2:
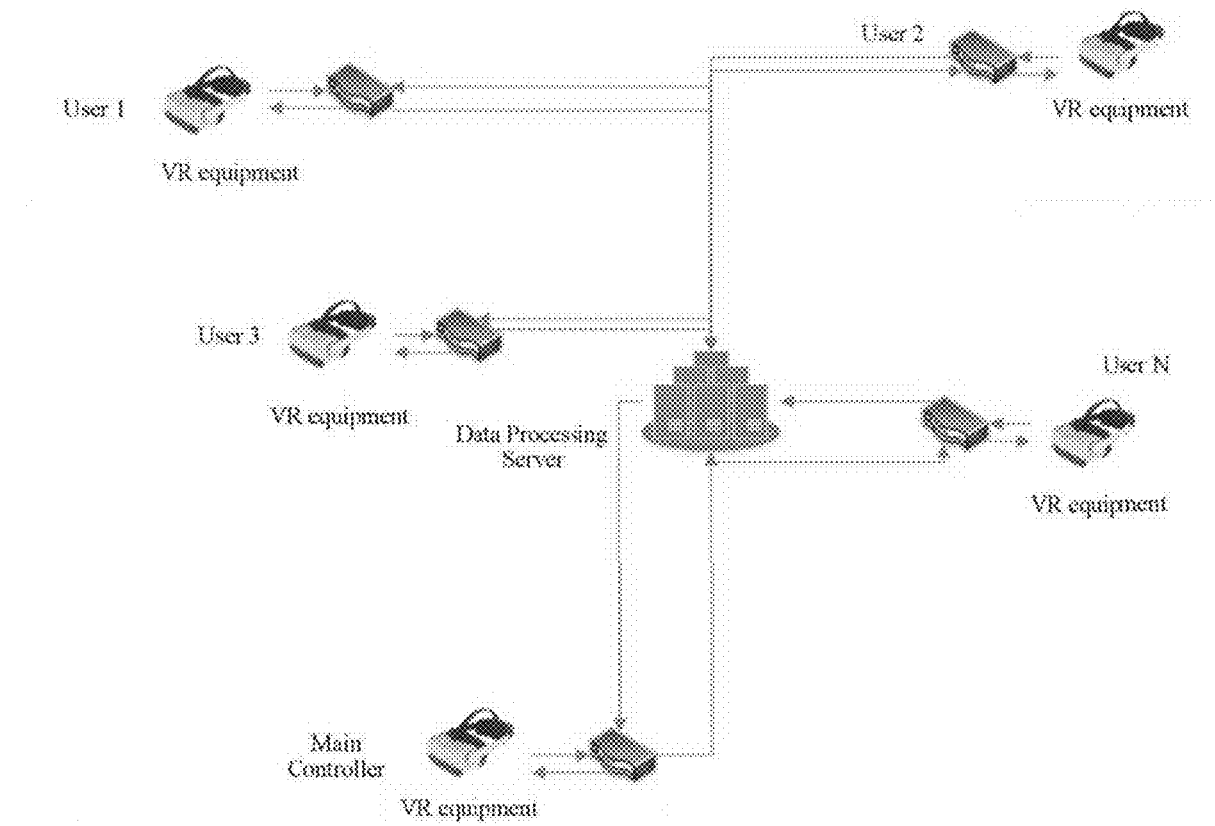
FIG. 2 is a schematic diagram of multi-user VR remote interaction according to an embodiment of the present disclosure.

It should be noted that the embodiment shown in FIG. 2 specifically describes the multi-person remote interaction method based on VR equipments by taking multi-person remote social networking as an example, however, this method can also be extended to other practical applications, such as VR based multi-person remote office, VR based multi-person remote conference and the like. The specific application scenario is not specifically limited in the embodiments of the present disclosure.

As shown in FIG. 2, in this embodiment, a data processing server needs to be built. The processing capacity, application scene rendering capacity and other hardware configurations and specifications of the server can be determined according to the number of clients (i.e. VR equipments shown in FIG. 2) in the actual application and the rendering complexity of VR content. Each client is connected to the network through a wireless network processor, such as a wireless router, and then is connected to a data processing server to realize network communication. In this embodiment, a main controller is also built, which plays the role of administrator in the system and is used to manage the VR equipments in the system. In this embodiment, the physical structure of the main controller is the same as that of the VR equipment.

The VR equipment shown in FIG. 2 is a head mounted equipment. The head mounted end of the VR equipment is provided therein with components such as CPU, GPU, wireless network module and the like. All computing and processing events of the VR equipment are realized at the head mounted end. As an example, the head mounted end of the VR equipment shown in FIG. 2 is provided therein with a 6 DOF positioning module, the 6 DOF positioning module comprises two or more camera sensors and IMU (inertial measurement unit) 9-axis inertial navigation sensors. The camera data and IMU 9-axis inertial navigation sensor data are combined through computer vision algorithm, and the 6 DOF position-posture tracking data of the VR equipment is acquired in real time, that is, the user's position and posture information relative to the real physical environment are acquired.

It should be noted that in some embodiments, the VR equipment can also be in other forms, which is not specifically limited in the present disclosure.

The VR equipment shown in FIG. 2 is externally connected with two handle controllers, and the user's left and right hands control the two handle controllers respectively. With the handle controllers, the user can interact with the content in the VR scene in real time. In this embodiment, the handle controllers are provided therein with an optical sensor or 3-axis electromagnetic sensor or ultrasonic sensor, by which together with the IMU 9-axis inertial navigation sensor built in the handle controllers, the 6 DOF data of the handles is calculated in real time, and the user's position-posture tracking data is obtained in real time.

It can be understood that the position-posture tracking data of multiple users obtained in real time in the embodiment may include data obtained by different sensor modules, for example, the position-posture tracking data of the user's head collected by the 6 DoF positioning module built in the head mounted end of the VR equipment as shown in FIG. 2, and the position-posture tracking data of the user's hand collected by the sensor module built in the handle controllers externally connected with the VR equipment. Both the 6 DOF data of the head mounted end and the 6 DOF data of the handle controllers are obtained through calculating process of the CPU in the head mounted end of the VR equipment.

With reference to the interaction scene shown in FIG. 2, the acquiring in real time the position-posture tracking data of multiple users collected by multiple VR equipments in the step S120 comprises: sending data requests to multiple VR equipments according to a set frequency, and receiving within a preset time position-posture tracking data replied by corresponding VR equipments.

Correspondingly, the merging the position-posture tracking data of multiple users based on the user IDs carried by the position-posture tracking data in the step S130 comprises: merging the position-posture tracking data that is replied by corresponding VR equipments and received within the preset time.

For example, the data processing server sends data requests to N number of VR equipments every 1 ms. When receiving the data request, each VR equipment sends the position-posture tracking data currently collected of its own user to the data processing server. The data processing server starts a timer when sending data requests to the N number of VR equipments. Within the preset time of the timer, for example, within the preset time of 20 ms, the data processing server receives the position-posture tracking data replied by each VR equipment. If within the preset time, the data processing server only receives the position-posture tracking data replied by some of the N number of VR equipments, the data processing server will merge the received position-posture tracking data replied by these VR equipments.

In this embodiment, the data processing server is used to send data requests according to a frequency, and by setting a preset time for receiving data, only the position-posture tracking data received within the preset time is merged so as to avoid the delay caused by the data processor waiting for all VR equipments to reply the position-posture tracking data before data merging.

In some embodiments, the data merging may be performed by the following methods: performing coordinate transform on the position-posture tracking data of multiple users to obtain position-posture merging data of each user in a same coordinate system.

The position-posture tracking data that is replied by the VR equipments and received by the data processing server is described based on the coordinate system of the VR equipment itself, therefore, in this embodiment, after receiving the position-posture tracking data, the data processing server performs coordinate transform on the position-posture tracking data received, and maps the position-posture tracking data to the coordinate system of the VR scene, so as to facilitate the VR equipments to subsequently update the user avatars in the VR scene based on the position-posture merging data.

In some embodiments, the updating position-posture status of user avatars having a same user ID in the VR scene of each VR equipment by using the position-posture merging data and its carried user IDs in the above step S110 comprises:

acquiring the position-posture merging data by using a first thread started by each VR equipment, and rendering and updating the user avatars having a same user ID in the VR scene using the position-posture merging data and its carried user IDs; and acquiring position-posture tracking data of an own user collected by the VR equipment by using a second thread that is parallel to the first thread and started by each VR equipment, and updating position-posture status of the own avatar in the VR scene by using the position-posture tracking data of the own user collected.

The calculation frequency with which the VR equipment collects the position-posture tracking data of its own user is different from the calculation frequency with which the data processing server obtains the position-posture merging data, therefore, in this embodiment, each VR equipment starts two parallel processing threads to update the position-posture status of its own avatar and the position-posture status of other user avatars respectively, so as to avoid the delay of position-posture status update caused by different calculation frequencies.

In some embodiments, the above step S110 further comprises: receiving an interaction request sent by the VR equipment, wherein the interaction request carries verification information and user data; confirming the interaction request sent by the VR equipment according to the verification information, and if the verification is passed, sending an interaction permission response to the VR equipment, and rendering the user avatar of the VR equipment that passed verification in the VR scene based on the user data; if the verification is failed, sending an interaction rejection response to the VR equipment.

With reference to the interaction scene shown in FIG. 2, when the VR equipment starts multi-person remote interaction, the VR equipment sends an interaction request to the data processing server, and the interaction request carries verification information and user data. The data processing server parses and saves the interaction request, and the data processing server forwards the interaction request to the main controller. The main controller makes judgment based on the verification information carried by the interaction request. If the verification is passed, an interaction permission response is sent to the data processing server. When the interaction permission response is received by the data processing server, the interaction permission response is sent to the VR equipment, and the saved user data of the VR equipment is sent to all other VR equipments in the system, so that the VR equipments in the system render the user avatar of the VR equipment that passes the verification in the VR scene. If the verification is failed, an interaction rejection response is sent to the data processing server, and the data processing server sends the rejection interaction response received to the VR equipment.

In some embodiments, the interaction method shown in FIG. 1 further comprises: receiving a removal command, wherein the removal command carries a user ID of the user avatar to be removed; and removing the user avatar to be removed from the VR scene of each VR equipment according to the user ID of the user avatar to be removed.

Still with reference to the interaction scene shown in FIG. 2, when the main controller receives the removal command, such as the removal command sent by the administrator, it sends the removal command to the data processing server, the data processing server forwards the removal command to each VR equipment, and each VR equipment removes the corresponding user avatar from the VR scene when receiving the removal command.

Based on the above description, the present embodiment can realize multi-user VR scene interaction.

A person skilled in the art can understand that all or part of the steps of the methods in the above embodiments can be completed by instructing relevant hardware through a program, the program can be stored in a computer readable storage medium, and the program can execute the steps described in FIG. 1. The storage medium includes ROM/RAM, magnetic disc, optical disc, etc.

Figure 3:
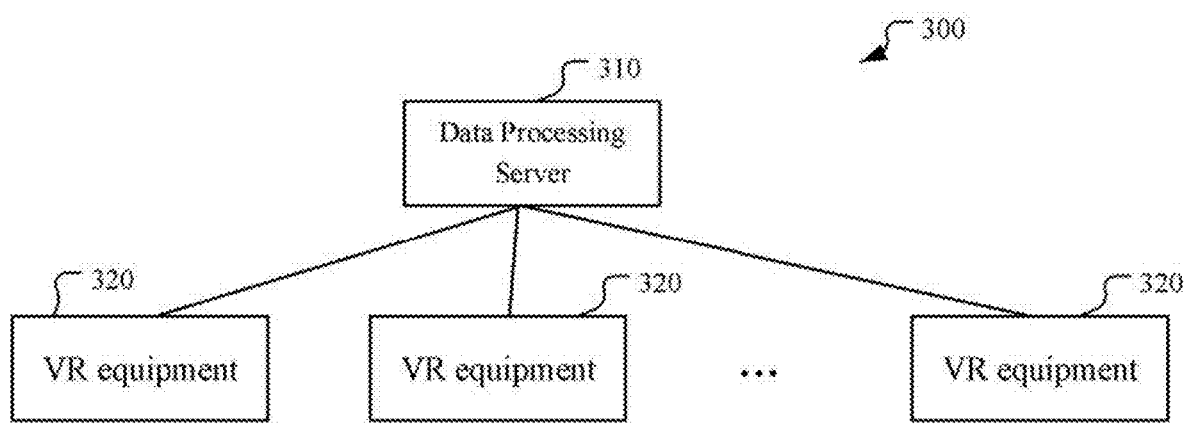
FIG. 3 is a diagram of the structure of an interaction system based on VR equipments according to an embodiment of the present disclosure.

Corresponding to the above method, the present disclosure also provides an interaction system based on virtual reality equipment. FIG. 3 is a diagram of the structure of an interaction system based on VR equipments according to an embodiment of the present disclosure. As described in FIG. 3, the system 300 of this embodiment comprises: a data processing server 310, and multiple VR equipments 320 connected to the data processing server 310 via the network;

the VR equipments 320 are for rendering a user avatar of each VR equipment in the VR scene according to user data of multiple VR equipments, collecting position-posture tracking data of own users, and sending the position-posture tracking data of own users collected to the data processing server 310, wherein the position-posture tracking data carries user IDs;

the data processing server 310 is for receiving in real time the position-posture tracking data of multiple users sent by multiple VR equipments, merging the position-posture tracking data of multiple users based on the user IDs carried by the position-posture tracking data, and sending position-posture merging data of each user obtained to each VR equipment, wherein the position-posture merging data carries user ID; and the VR equipments 320 are further for updating position-posture status of user avatars having a same user ID in the VR scene of each VR equipment by using the position-posture merging data and its carried user IDs, to realize interaction among different user avatars in the VR scene.

In some embodiments, the data processing server 310 is further for sending data requests to multiple VR equipments according to a set frequency, and receiving within a preset time position-posture tracking data replied by corresponding VR equipments;

the VR equipments 320 are further for replying the position-posture tracking data to the data processing server 310 according to the data request received; and the data processing server 310 is further for merging the position-posture tracking data that is replied by the corresponding VR equipments and received within a preset time.

In some embodiments, the data processing server 310 is specifically for performing coordinate transform on the position-posture tracking data of multiple users to obtain position-posture merging data of each user in a same coordinate system.

In some embodiments, the VR equipment 320 is further for acquiring the position-posture merging data by starting a first thread, and rendering and updating the user avatars having a same user ID in the VR scene using the position-posture merging data and its carried user IDs; and acquiring position-posture tracking data of an own user collected by the VR equipment by starting a second thread that is parallel to the first thread, and updating position-posture status of the own avatar in the VR scene by using the position-posture tracking data of the own user collected.

In some embodiments, the interaction system further comprises a main controller connected to the data processing server 310 via network;

the data processing server 310 is further for receiving an interaction request sent by the VR equipment and send the interaction request received to the main controller, wherein the interaction request carries verification information and user data;

the main controller is for confirming the interaction request sent by the VR equipment according to the verification information and sending a verification result to the data processing server;

the data processing server 310 is further for responding to the interaction request according to the verification result, and if the verification is passed, sending an interaction permission response to the VR equipment; if the verification is failed, sending an interaction rejection response to the VR equipment; and the VR equipments 320 are further for receiving an interaction response, and if the interaction response is the interaction permission response, rendering the user avatar of the VR equipment that passed verification in the VR scene based on the user data; if the interaction response is the interaction rejection response, finishing this interaction.

To sum up, in the embodiments of the present disclosure, the users of multiple VR equipments are virtualized into the same VR scene, so that the users in the same physical area or in different physical areas experience the same VR environment; by merging the position-posture tracking data of multiple users, and updating the position-posture status of user avatars having the corresponding user ID in the VR scene of each VR equipment by using the position-posture merging data obtained by data merging and the user IDs, the interaction among different user avatars in the VR scene is realized, and other users can observe the status of other users in the VR scene in real time on the VR equipment from a third perspective, so that the user's VR experience is enhanced, and it is made possible for content creators to integrate social and multi-user dimensions into the VR world.

Figure 4:
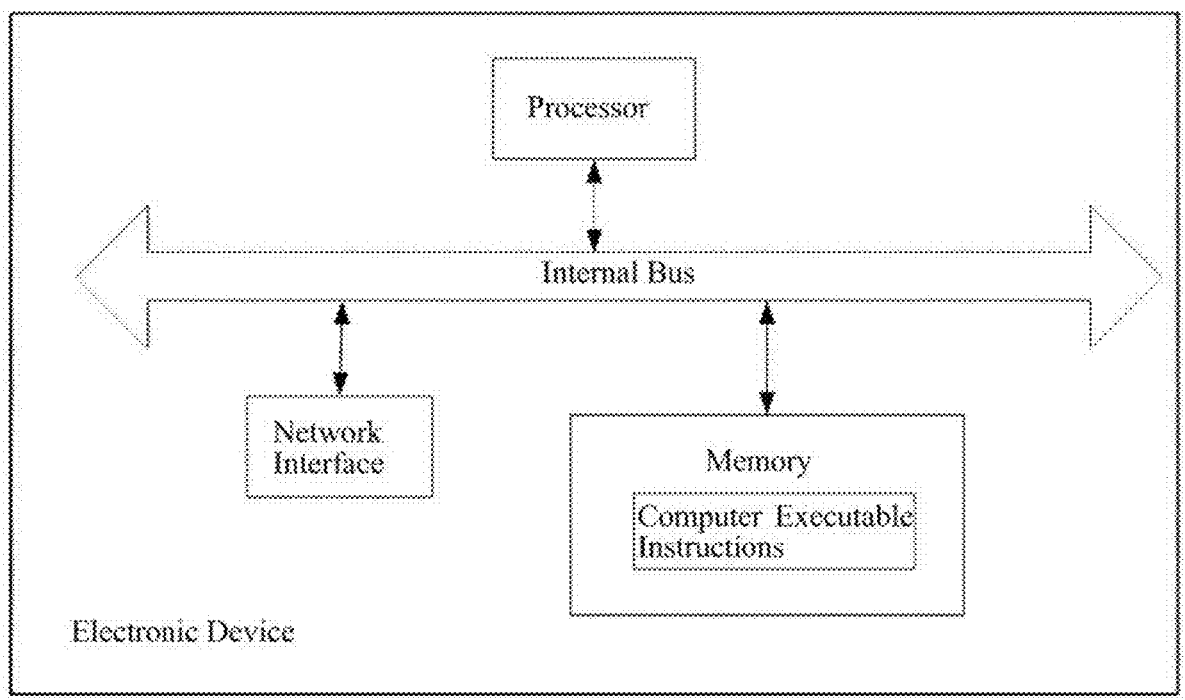
FIG. 4 is a diagram of the structure of an electronic device according to an embodiment of the present disclosure.

FIG. 4 is a diagram of the structure of an electronic device according to an embodiment of the present disclosure. Referring to FIG. 4, at the hardware level, the electronic device comprises a processor and, optionally, an internal bus, a network interface and a memory. The memory may include an internal memory such as high-speed random access memory (RAM), or a non-volatile memory such as at least one disk memory. Of course, the electronic device may also include hardware required by other services.

The processor, network interface and memory may be connected to each other through an internal bus. The internal bus may be an ISA (Industry Standard Architecture) bus, PCI (Peripheral Component Interconnect) bus or EISA (Extended Industry Standard Architecture) bus, or the like. The bus may be divided into an address bus, a data bus, a control bus, and the like. For ease of illustration, it is represented only by a bidirectional arrow in FIG. 4, but it does not mean that there is only one bus or one type of bus.

The memory is for storing programs. Specifically, the program may include program codes including computer operation instructions. The memory may include an internal memory and a nonvolatile memory, and provide instructions and data to the processor.

The processor reads the corresponding computer program from the nonvolatile memory into the internal memory and then runs, and forms an interaction system based on virtual reality equipment at the logical level. The processor executes the program stored in the memory and is specifically used to perform the following operations:

rendering a user avatar of each virtual reality equipment in the virtual reality scene according to user data of multiple virtual reality equipments;

acquiring in real time position-posture tracking data of multiple users collected by multiple virtual reality equipments, wherein the position-posture tracking data carries user IDs;

merging the position-posture tracking data of multiple users based on the user IDs carried by the position-posture tracking data, to obtain position-posture merging data of each user, wherein the position-posture merging data carries user ID; and updating position-posture status of user avatars having a same user ID in the virtual reality scene of each virtual reality equipment by using the position-posture merging data and its carried user IDs, to realize interaction among different user avatars in the virtual reality scene.

The above method executed by the interaction system based on the virtual reality equipments disclosed in the embodiment shown in FIG. 3 of the present disclosure can be applied to the processor or implemented by the processor. The processor may be an integrated circuit chip with signal processing capability. In the process of implementation, the steps of the above method may be completed by hardware integrated logic circuit or software instructions in the processor. The processor may be a general purpose processor, such as a central processing unit (CPU), a network processor (NP), etc; it may also be digital signal processor (DSP), application specific integrated circuit (ASIC), field programmable gate array (FPGA) or other programmable logic devices, discrete gate or transistor logic devices, and discrete hardware components that can implement or execute the methods, steps and logical block diagrams disclosed in the embodiments of the present disclosure. The general purpose processor may be a microprocessor or any conventional processor or the like. The steps of the method disclosed in the embodiments of the present disclosure may be directly executed by the hardware in a decoding processor, or by the combination of hardware and software modules in the decoding processor. The software module may be located in RAM, flash memory, read-only memory, programmable read-only memory or electrically erasable programmable memory, register and other mature storage media in the art. The storage medium is located in the memory; the processor reads the information in the memory and completes the steps of the above method in combination with its hardware.

The electronic device can also execute the interaction method based on the virtual reality equipments in FIG. 1 and realize the function of the interaction system based on the virtual reality equipments in the embodiment shown in FIG. 3, which will not be repeated here.

It should be noted that:

The algorithms and demonstrations provided herein are not intrinsically associated with any particular computer, virtual system, or other device. All general-purpose devices can be used in conjunction with demonstrations here. Based on the above descriptions, it is obvious to construct such a device as required. In addition, the present disclosure is not dependent on any particular programming language. It can be understood that various programming languages can be used to realize contents of the present disclosure described herein, and that the above descriptions concerning specific languages are intended to reveal the best embodiments of the present disclosure.

The specification provided herein described a lot of details. However, it can be understood that embodiments of the present disclosure can be practiced without such details. In some embodiments, commonly known methods, structures, and technologies are not described in detail, so as not to obscure the understanding of this specification.

Similarly, it should be understood that in order to simplify the present disclosure and help understand one or more of the various aspects of the invention, in the above description of the exemplary embodiments of the present disclosure, various features of the present disclosure are sometimes grouped together into a single embodiment, figure, or description thereof. However, the method disclosed should not be interpreted as reflecting the intention that the claimed features of the present disclosure require more features than those explicitly recited in each claim, or more exactly, as reflected in the following claims, the features of the aspect of the invention are fewer than all features of any single embodiment disclosed above. Therefore, claims in line with a specific embodiment are hereby incorporated into that embodiment explicitly, where each claim itself is regarded as a separate embodiment of the present disclosure.

A person skilled in the art can understand that the modules in the device in an embodiment can be adaptively changed and set in one or more devices different from the embodiment. The modules or units or components in the embodiments may be combined into one module or unit or component, and in addition, they may be divided into multiple sub-modules or sub-units or sub-components. Except that at least some of such features and/or processes or units are mutually exclusive, any combination of all features disclosed by this specification (including accompanying claims, abstract, and drawings) and any method or all processes or units of the device disclosed in such a way is possible. Unless otherwise expressly stated, each feature disclosed in this specification (including accompanying claims, abstract and drawings) may be replaced by a substitute feature that provides the same, equivalent, or similar purpose.

In addition, a person skilled in the art can understand that although some embodiments described herein include some features included in other embodiments instead of other features, the combination of features of different embodiments means that they are within the scope of the present disclosure and form different embodiments. For example, in the following claims, any one of the claimed embodiments can be used in any combination.

The various components in the embodiments of the present disclosure may be implemented by hardware, or by software modules running on one or more processors, or by the combination thereof. A person skilled in the art should understand that a microprocessor or digital signal processor (DSP) may be used in practice to realize some or all functions of some or all components in the interaction system according to the embodiments of the present disclosure. The present disclosure may also be implemented as a device or device program (for example, a computer program and a computer program product) for performing part or all of the methods described herein. Such a program implementing the present disclosure may be stored on a computer-readable medium or may have the form of one or more signals. Such signals may be downloaded from the internet websites, or provided on carrier signals, or in any other form.

It should be noted that the above embodiments are intended to illustrate but not to limit the present disclosure, and a person skilled in the art can design alternative embodiments without departing from the scope of the appended claims. In the claims, any reference symbol between parentheses shall not constitute a limitation of the claims. The word "comprise" does not exclude the existence of elements or steps not listed in the claims. The word "a" or "an" in front of an element does not exclude the presence of a plurality of such elements. The present disclosure can be implemented by means of hardware including several different elements and by means of a properly programmed computer. In the device claims listing several units, several of these units can be embodied in the same hardware item. The use of words "first", "second", and "third", etc. does not indicate any order. These words can be interpreted as names.

What is claimed is:

1. An interaction method based on virtual reality equipment, comprising:

rendering a user avatar of each virtual reality equipment in the virtual reality scene of each virtual reality equipment according to user data of multiple virtual reality equipments;

acquiring in real time position-posture tracking data of multiple users collected by multiple virtual reality equipments, wherein the position-posture tracking data carries user IDs;

merging the position-posture tracking data of multiple users based on the user IDs carried by the position-posture tracking data, to obtain position-posture merging data of each user, wherein the position-posture merging data carries user ID; and updating position-posture status of user avatars having a same user ID in the virtual reality scene of each virtual reality equipment by using the position-posture merging data and its carried user IDs, to realize interaction among different user avatars in the virtual reality scene;

wherein the updating position-posture status of user avatars having a same user ID in the virtual reality scene of each virtual reality equipment by using the position-posture merging data and its carried user IDs comprises:

acquiring the position-posture merging data by using a first thread started by the virtual reality equipment, and rendering and updating the user avatars having a same user ID in the virtual reality scene using the position-posture merging data and its carried user IDs; and acquiring position-posture tracking data of a user of the virtual reality equipment collected by the virtual reality equipment by using a second thread that is parallel to the first thread and started by the virtual reality equipment, and updating position-posture status of an avatar of the virtual reality equipment in the virtual reality scene by using the position-posture tracking data of the user collected.

2. The method according to claim 1, wherein the acquiring in real time position-posture tracking data of multiple users collected by multiple virtual reality equipments comprises:

sending data requests to multiple virtual reality equipments according to a set frequency, and receiving within a preset time position-posture tracking data replied by corresponding virtual reality equipments.

3. The method according to claim 2, wherein the merging the position-posture tracking data of multiple users based on the user IDs carried by the position-posture tracking data comprises:

merging the position-posture tracking data that is replied by the corresponding virtual reality equipments and received within the preset time.

4. The method according to claim 1, wherein the merging the position-posture tracking data of multiple users based on the user IDs carried by the position-posture tracking data, to obtain position-posture merging data of each user comprises:

performing coordinate transform on the position-posture tracking data of multiple users to obtain position-posture merging data of each user in a same coordinate system.

5. The method according to claim 1, wherein the rendering a user avatar of each virtual reality equipment in the virtual reality scene of each virtual reality equipment according to user data of multiple virtual reality equipments comprises:

receiving an interaction request sent by the virtual reality equipment, wherein the interaction request carries verification information and user data;

confirming the interaction request sent by the virtual reality equipment according to the verification information, and if the verification is passed, sending an interaction permission response to the virtual reality equipment, and rendering the user avatar of the virtual reality equipment that passed verification in the virtual reality scene based on the user data; if the verification is failed, sending an interaction rejection response to the virtual reality equipment.

6. The method according to claim 5, further comprising:
receiving a removal command, wherein the removal command carries a user ID of the user avatar to be removed; and removing the user avatar to be removed from the virtual reality scene of each virtual reality equipment according to the user ID of the user avatar to be removed.

7. An interaction system based on virtual reality equipment, comprising: a data processing server, and multiple virtual reality equipments connected to the data processing server via a network;

the virtual reality equipments are for rendering a user avatar of each virtual reality equipment in the virtual reality scene of each virtual reality equipment according to user data of multiple virtual reality equipments, and collecting position-posture tracking data of own users and sending the collected position-posture tracking data of own users to the data processing server, wherein the position-posture tracking data carries user IDs;

the data processing server is for receiving in real time the position-posture tracking data of multiple users sent by multiple virtual reality equipments, merging the position-posture tracking data of multiple users based on the user IDs carried by the position-posture tracking data, and sending position-posture merging data of each user obtained to each virtual reality equipment, wherein the position-posture merging data carries user ID;

the virtual reality equipments are further for updating position-posture status of user avatars having a same user ID in the virtual reality scene of each virtual reality equipment by using the position-posture merging data and its carried user IDs, to realize interaction among different user avatars in the virtual reality scene; wherein the updating position-posture status of user avatars having a same user ID in the virtual reality scene of each virtual reality equipment by using the position-posture merging data and its carried user IDs comprises:

acquiring the position-posture merging data by using a first thread started by the virtual reality equipment, and rendering and updating the user avatars having a same user ID in the virtual reality scene using the position-posture merging data and its carried user IDs; and acquiring position-posture tracking data of a user of the virtual reality equipment collected by the virtual reality equipment by using a second thread that is parallel to the first thread and started by the virtual reality equipment, and updating position-posture status of an avatar of the virtual reality equipment in the virtual reality scene by using the position-posture tracking data of the user collected.

8. The interaction system according to claim 7, wherein the data processing server is further for sending data requests to multiple virtual reality equipments according to a set frequency, and receiving within a preset time position-posture tracking data replied by corresponding virtual reality equipments;

the virtual reality equipments are further for replying the position-posture tracking data to the data processing server according to the data request received;

the data processing server is further for merging the position-posture tracking data that is replied by the corresponding virtual reality equipments and received within the preset time.

9. The interaction system according to claim 8, further comprising a main controller connected to the data processing server via the network;

the data processing server is further for receiving an interaction request sent by the virtual reality equipment and send the interaction request received to the main controller, wherein the interaction request carries verification information and user data;

the main controller is for confirming the interaction request sent by the virtual reality equipment according to the verification information and sending a verification result to the data processing server;

the data processing server is further for responding to the interaction request according to the verification result, and if the verification result is passed, sending an interaction permission response to the virtual reality equipment; if the verification result is failed, sending an interaction rejection response to the virtual reality equipment;

the virtual reality equipment is further for receiving an interaction response, and if the interaction response is the interaction permission response, rendering the user avatar of the virtual reality equipment that passed verification in the virtual reality scene based on the user data; and if the interaction response is the interaction rejection response, finishing this interaction.

10. An electronic device, comprising: a processor; and a memory configured to store computer executable instructions that, when executed, cause the processor to execute a interaction method based on virtual reality equipment, and the method comprises:
rendering a user avatar of each virtual reality equipment in the virtual reality scene of each virtual reality equipment according to user data of multiple virtual reality equipments;
acquiring in real time position-posture tracking data of multiple users collected by multiple virtual reality equipments, wherein the position-posture tracking data carries user IDs;
merging the position-posture tracking data of multiple users based on the user IDs carried by the position-posture tracking data, to obtain position-posture merging data of each user, wherein the position-posture merging data carries user ID; and
updating position-posture status of user avatars having a same user ID in the virtual reality scene of each virtual reality equipment by using the position-posture merging data and its carried user IDs, to realize interaction among different user avatars in the virtual reality scene;
wherein the updating position-posture status of user avatars having a same user ID in the virtual reality scene of each virtual reality equipment by using the position-posture merging data and its carried user IDs comprises:
acquiring the position-posture merging data by using a first thread started by the virtual reality equipment, and rendering and updating the user avatars having a same user ID in the virtual reality scene using the position-posture merging data and its carried user IDs; and
acquiring position-posture tracking data of a user of the virtual reality equipment collected by the virtual reality equipment by using a second thread that is parallel to the first thread and started by the virtual reality equipment, and updating position-posture status of an avatar of the virtual reality equipment in the virtual reality scene by using the position-posture tracking data of the own user collected.

11. The electronic device according to claim 10, wherein the acquiring in real time position-posture tracking data of multiple users collected by multiple virtual reality equipments comprises:
sending data requests to multiple virtual reality equipments according to a set frequency, and receiving within a preset time position-posture tracking data replied by corresponding virtual reality equipments.

12. The electronic device according to claim 11, wherein the merging the position-posture tracking data of multiple users based on the user IDs carried by the position-posture tracking data comprises:
merging the position-posture tracking data that is replied by the corresponding virtual reality equipments and received within the preset time.

13. The electronic device according to claim 10, wherein the merging the position-posture tracking data of multiple users based on the user IDs carried by the position-posture tracking data, to obtain position-posture merging data of each user comprises:
performing coordinate transform on the position-posture tracking data of multiple users to obtain position-posture merging data of each user in a same coordinate system.

14. The electronic device according to claim 10, wherein the rendering a user avatar of each virtual reality equipment in the virtual reality scene of each virtual reality equipment according to user data of multiple virtual reality equipments comprises:
receiving an interaction request sent by the virtual reality equipment, wherein the interaction request carries verification information and user data;
confirming the interaction request sent by the virtual reality equipment according to the verification information, and if the verification is passed, sending an interaction permission response to the virtual reality equipment, and rendering the user avatar of the virtual reality equipment that passed verification in the virtual reality scene based on the user data; if the verification is failed, sending an interaction rejection response to the virtual reality equipment.

15. The electronic device according to claim 14, the method further comprises:
receiving a removal command, wherein the removal command carries a user ID of the user avatar to be removed; and
removing the user avatar to be removed from the virtual reality scene of each virtual reality equipment according to the user ID of the user avatar to be removed.

16. A non-transitory computer-readable storage medium storing one or more programs that, when executed by an electronic device including a plurality of application programs, cause the electronic device to execute a interaction method based on virtual reality equipment, and the method comprises:
rendering a user avatar of each virtual reality equipment in the virtual reality scene of each virtual reality equipment according to user data of multiple virtual reality equipments;
acquiring in real time position-posture tracking data of multiple users collected by multiple virtual reality equipments, wherein the position-posture tracking data carries user IDs;
merging the position-posture tracking data of multiple users based on the user IDs carried by the position-posture tracking data, to obtain position-posture merging data of each user, wherein the position-posture merging data carries user ID; and
updating position-posture status of user avatars having a same user ID in the virtual reality scene of each virtual reality equipment by using the position-posture merging data and its carried user IDs, to realize interaction among different user avatars in the virtual reality scene;
wherein the updating position-posture status of user avatars having a same user ID in the virtual reality scene of each virtual reality equipment by using the position-posture merging data and its carried user IDs comprises:
acquiring the position-posture merging data by using a first thread started by the virtual reality equipment, and rendering and updating the user avatars having a same user ID in the virtual reality scene using the position-posture merging data and its carried user IDs; and
acquiring position-posture tracking data of a user of the virtual reality equipment collected by the virtual reality equipment by using a second thread that is parallel to the first thread and started by the virtual reality equipment, and updating position-posture status of an avatar of the virtual reality equipment in the virtual reality scene by using the position-posture tracking data of the user collected.

* * * * *